INVENTOR.
Robert L. Martin
Richard Chute
BY Barnard, McGlynn & Reising
ATTORNEYS

United States Patent Office

3,429,583
Patented Feb. 25, 1969

3,429,583
VEHICLE SAFETY SYSTEM
Robert L. Martin, Detroit, and Richard Chute, Huntington Woods, Mich., assignors to Eaton Yale & Towne, Inc., Cleveland, Ohio, a corporation of Ohio
Filed Mar. 10, 1967, Ser. No. 622,245
U.S. Cl. 280—150     2 Claims
Int. Cl. B60r 21/04

ABSTRACT OF THE DISCLOSURE

A safety assembly adapted to be attached to a vehicle for protecting an occupant thereof and including an inflatable bag, a container in communication with the bag to store fluid for inflating the bag, and a linear and shaped explosive charge for concentrating the energy resulting from the activation thereof for opening the container.

---

A great deal of research and development has recently occurred in an effort to develop safety systems for vehicles, particularly safety systems for passenger vehicles such as automobiles. One safety system which is thoroughly being investigated is one utilizing a confinement or an inflatable bag which is automatically inflated in response to a predetermined condition of the automobile to prevent the occuptant of the automobile from contacting or impacting against the instrument panel, windshield, or the like. In other words, the bag is inflated during a crash to prevent the occupant of the automobile from incurring serious injuries as a result of impact with the interior of the vehicle body.

The time in which the bag must be inflated is very critical and is measured in terms of milliseconds. Consequently, one of the problems being thoroughly researched is that relating to a means for rapidly inflating the bag. One such means which has proven satisfactory is an elongated cylindrical reservoir or container for storing presurized fluid and including an explosive charge disposed centrally within the container whereby upon activation of the explosive charge, the energy resulting therefrom opens the container to exhaust pressurized fluid into the bag for inflating the bag. Heretofore, the container normally included a stress riser, such as a groove extending therealong, for predetermining the area at which the container opens as a result of activating the explosive charge. In other words, a groove or another appropriate weakened portion extends longitudinally along the container so that upon activation of the explosive charge, the container ruptures or breaks along such a groove or weakened portion. The container, however, must have a minimum wall thickness which is commensurate with the amount of fluid pressure to be contained therein and therefore the thickness of the container at the point having the groove must be of that minimum wall thickness. Therefore, the material of the container, which provides a wall thickness greater than the thickness at the point of the groove, is not necessary for strength. It is only required to define a groove or weakened portion for predetermining the area of the opening resulting from the activation of the explosive charge.

It has been discovered that even without utilizing a stress riser, i.e., a weakened portion in the container, a cylindrical container will rupture or open along a line directed substantially longitudinally therealong when an explosive means is disposed within the container and activated. However, there is no way of predetermining the position or area of opening of such a container upon activation of the explosive charge. In addition, the explosive means disposed within the container releases energy in all directions when activated and therefore an explosive means of ample magnitude must be utilized to insure that the container opens.

Accordingly, it is an object and feature of this invention to provide a container means adapted to be attached to an inflatable bag for providing a safety system wherein the container means has a minimum constant wall thickness and includes an explosive means of minimum magnitude for opening the container in a predetermined area.

Another object and feature of this invention is to provide container means adapted to be attached to an inflatable bag to provide a safety system for a vehicle wherein the container means is in combination with a linear and shaped charge to direct the energy resulting from the activation thereof to a predetermined portion of the container means for opening the container means.

In general, these and other objects and features of this invention may be attained in a preferred embodiment including an inflatable bag and an inner cylindrical container in communication with the bag to store fluid for inflating the bag. A linear and shaped explosive charge is disposed longitudinally along a portion of the inner cylindrical container and is shaped to concentrate or direct the energy resulting from the activation thereof along a predetermined line on the container for opening the container. A member is helically disposed in spaced relation about the inner cylindrical container for controlling the opening of the container upon activation of the explosive means. An outer cylindrical member is disposed in spaced relationship about the helically disposed member for controlling the flow of fluid from the inner cylindrical container. The outer cylindrical member has a plurality of outlet openings spaced both circumferentially and axially from the explosive charge so that fragments resulting from the activation of the explosive charge move longitudinally with respect to the outer cylindrical container and are prevented from moving radially outwardly through the outlet openings thereof.

Other objects and attendant advantages of the present invention will be readily appreciated as the same becomes better understood by reference to the following detailed description when considered in connection with the accompanying drawings wherein.

Figure 1:
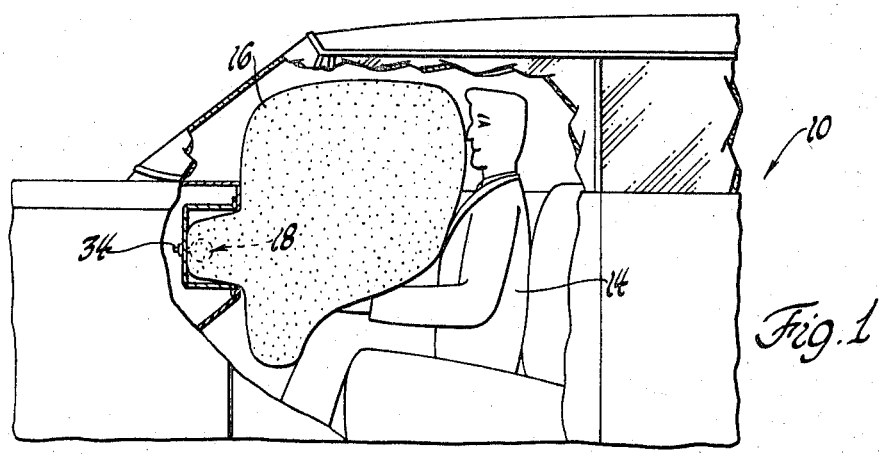
FIGURE 1 is a partially broken away fragmentary view of the assembly of the instant invention.
Figure 2:
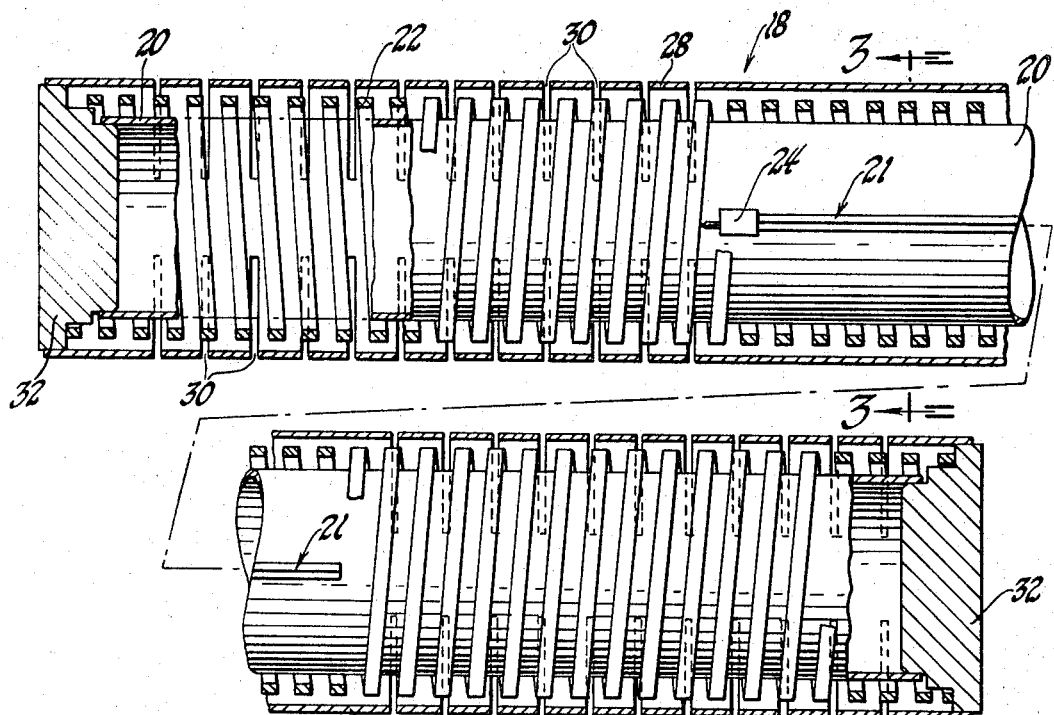
FIGURE 2 is an enlarged cross sectional view of the pressure source utilized in the assembly of the instant invention.
Figure 3:
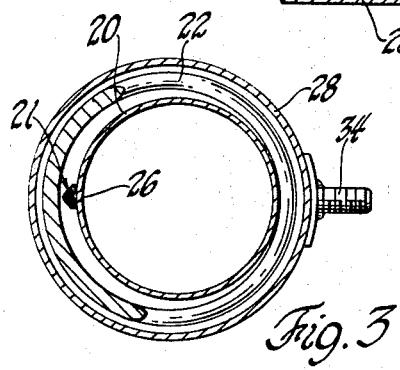
FIGURE 3 is a cross sectional view taken substantially along line 3—3 of FIGURE 2.

Referring now to the drawings, wherein like numerals indicate like or corresponding parts throughout the several views, a vehicle is generally shown at 10 in combination with a safety system generally shown at 12 for protecting the occupant 14 of the vehicle.

The assembly includes an inflatable bag or confinement 16 and a fluid source or reservoir, generally shown at 18. The fluid source 18 inflates the bag 16. The bag 16 is normally stored in a collapsed folded position and an appropriate sensing means is utilized to inflate the bag 16 in the event of a crash or any other predetermined operating condition of the vehicle so as to prevent the occupant 14 from moving forward and impacting portions of the vehicle, such as the instrument panel and/or windshield.

The fluid source 18 includes the container means comprising the inner cylindrical container 20 which is in communication with the bag 16 and stores fluid for inflating the bag. An appropriate valve (not shown) communicates with the inner cylindrical container 20 for charging or pressurizing the container 20 with pressurized fluid.

There is also included an explosive means, generally indicated at 21 and which is shaped to concentrate or direct the energy resulting from the activation thereof to a predetermined portion of the cylindrical container 20 for opening the inner cylindrical container 20. As will be explained more fully hereinafter, the explosive means 21 is linear and is shaped to concentrate or direct the energy resulting from the activation thereof along a line on the container 20. The explosive means 21 is secured to the container 20 in any appropriate manner such as by an appropriate adhesive or tape, or the like.

There is also included a limiting means comprising the member 22 for controlling the opening of the container 20 upon the activation of the explosive means 21. The member 22 is helically coiled in spaced relationship about the inner cylindrical container 20. It will be noted that the explosive means 21 extends longitudinally along the container 20 but only along a portion thereof. The member 22 need only be disposed along that portion over which the explosive means 21 extends; however, as illustrated, the helically coiled member 22 is disposed along the entire length of the container 20. An appropriate detonating device 24 is attached to the linearly shaped charge 21 for activation thereof. The igniting or detonating device 24 may be attached to an appropriate sensing device such as an accelerometer or inertia responsive switch. An example is shown in copending application Ser. No. 562,289, filed July 1, 1966 in the names of Sidney Oldberg and William R. Carey and assigned to the assignee of the instant invention. Upon the activation or detonation of the explosive means 21, the container 20 is opened along a line 26 over which the explosive means 21 is disposed. As the container is opened along the line 26, the portions of the container 20 on either side of the opening thereof move radially outward until they engage the member 22; thus, the member 22 limits the radially outward movement of the portions of the container 20 on either side of the opening thereof. The member 22 is rectangular in cross section so that as the portions of the container 20 on either side of the opening thereof move radially outwardly, the edges of the member 22 grip or dig thereinto to prevent the member 22 from moving longitudinally relative to the container 20. This feature is disclosed and claimed in copending application Ser. No. 621,974 filed Mar. 9, 1967 in the name of Richard Chute and assigned to the assignee of the instant invention.

There is also included a flow control means comprising the outer cylindrical member 28 disposed in spaced relationship to the member 22 and the inner container 20 for controlling fluid flow from the container 20 upon the opening thereof. The outer cylindrical member 28 has a plurality of outlet openings 30 therein. The outlet openings 30 are spaced both circumferentially and axially from the explosive means 21. When the container 20 is opened, fluid flows therefrom and thereabout and through the openings 30 to inflate the bag 16. The configuration of the cylindrical member 28 and the openings 30 therein is specifically described and claimed in copending application Ser. No. 621,845, filed Mar. 9, 1967, and assigned to the assignee of the instant invention.

The plug means 32 defines the ends of the cylindrical container 20 and the outer cylindrical member 28 and also supports the helically disposed member 22. The studs 34 are attached to the outer cylindrical member 28 for securing the assembly to a support structure such as a vehicle as illustrated in FIGURE 1.

Figure 4:
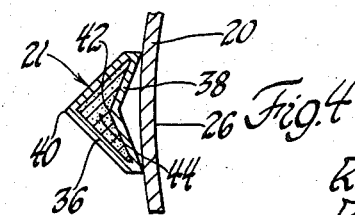
FIGURE 4 is an enlarged fragmentary cross-sectional view of a preferred embodiment of the explosive means utilized in the instant invention.

The preferred embodiment of the explosive means is illustrated most specifically in FIGURE 4 and includes an elongated hollow member having a cross section defined by spaced first and second V-shaped portions 36 and 38. The V-shaped portions 36 and 38 have respective apexes 40 and 42 which extend in the same direction. The V-shaped portions 36 and 38 are joined at the extremities of the legs thereof and an explosive charge 44 is disposed in the space between the V-shaped portions 36 and 38. The hollow member as defined by the V-shaped portions 36 and 38 is preferably made of metal and is flexible or bendable along its length. This type of explosive means is frequently referred to as a flexible linear shaped charge. The cross-sectional configuration of the explosive means results in a concentration or directing of the energy upon the activation thereof so that the container 20 opens along a line 26.

The outer cylindrical member 28 is devoid of openings 30 therealong in the area over which the explosive means 21 extends so as to prevent fragments of the explosive means 21 from moving outwardly through the openings 30 and into the bag. Such fragments could rupture the bag 16. Because the outlet openings 30 are both circumferentially and axially spaced relative to the explosive means 21, the movement of the fragments of the explosive means 21 is initially longitudinally along the outer container 28; thus, the inertia or momentum thereof prevents such fragments from moving radially outwardly and through the outlet openings 30.

By using a linearly shaped charge in accordance with the instant invention, a much smaller amount of an explosive may be utilized, thus introducing a significant safety factor and, additionally, the container may be opened along a precise and predetermined line. Of course, it will be understood that the shaped charge may be disposed either on the outside of the container, as shown, or on the inside of the container.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An assembly adapted to be attached to a vehicle for protecting an occupant of the vehicle, said assembly comprising; an inflatable bag, container means in communication with said bag to store fluid for inflating said bag, explosive means shaped to direct the energy resulting from the activation thereof to a predetermined portion of said container means for opening said container means, said explosive means being linear and shaped to concentrate the energy resulting from the activation thereof along a line on said container means, limiting means for controlling the opening of said container means upon the activation of said explosive means, flow control means disposed in spaced relationship to said limiting means and said container means for controlling fluid flow from said container means upon the opening thereof, said container means comprising an inner cylindrical member and said explosive means being disposed longitudinally therealong, said explosive means extending longitudinally along only a portion of said inner cylindrical member, and said flow control means comprises an outer cylindrical member having a plurality of outlet openings spaced both circumferentially and axially from said explosive means, and said limiting means comprises a member helically coiled about said inner cylindrical member at least along the portion thereof over which said explosive means extends.

2. An assembly as set forth in claim 1 wherein said explosive means includes an elongated hollow member having a cross section defined by spaced first and second V-shaped portions having apexes extending in the same direction and joined at the extremities of the legs thereof, and an explosive charge disposed in the space between said V-shaped portions.

References Cited

UNITED STATES PATENTS

| 2,834,606 | 5/1958 | Bertrand | 280—150 |
| 2,850,291 | 9/1958 | Ziccardi | 280—150 |
| 3,185,089 | 5/1965 | Parkhurst et al. | 102—24 |
| 3,191,533 | 6/1965 | Hopson | 102—24 |
| 3,197,234 | 7/1965 | Bertrand | 280—150 |

BENJAMIN HERSH, *Primary Examiner.*

JOEL E. SIEGEL, *Assistant Examiner.*

U.S. Cl. X.R.

222—5; 102—24